United States Patent [19]

Roberti

[11] 4,012,548

[45] Mar. 15, 1977

[54] HIGH STRENGTH COMPOSITE WOOD VENEER ARTICLES

[76] Inventor: Barney Roberti, Mathews Road, Youngsville, Pa. 16371

[22] Filed: Apr. 6, 1976

[21] Appl. No.: 674,189

[52] U.S. Cl. .................... 428/106

[51] Int. Cl.[2] .................... B32B 5/12

[58] Field of Search .................... 428/106, 112, 114

[56] References Cited

UNITED STATES PATENTS 1,628,886 5/1927 Jackson et al. .................... 428/106

2,578,781 12/1951 Brundige .................... 428/55

FOREIGN PATENTS OR APPLICATIONS 1,224,180 2/1960 France .................... 428/106

*Primary Examiner*—William J. Van Balen

*Attorney, Agent, or Firm*—Arnold B. Silverman

[57] ABSTRACT

A composite wood veneer article having a lower layer of wood veneer having a grain orientation generally in a first direction and an upper layer of wood veneer having a grain orientation generally in the first direction. At least two layers of wood veneer are interposed between the upper and lower layers. At least one of the interposed layers has a grain orientation offset from the first direction by about 10° to 25°, preferably about 15° to 20°. Adjacent layers of the wood veneer are adhesively bonded in generally surface to surface relationship to each other.

In one embodiment, both interposed layers have grain orientations offset from the first direction by about 10° to 25°. The interposed offset layers may be offset on opposite sides of the first direction. In another embodiment, the article may have three interposed layers with one of the three having a grain orientation generally in the first direction. In another embodiment, four interposed layers may be provided, and all four interposed layers may be offset at an angle of about 10° to 25°. Adjacent interposed offset layers are preferably offset on opposite sides of the first direction.

16 Claims, 17 Drawing Figures

FIG. 1.
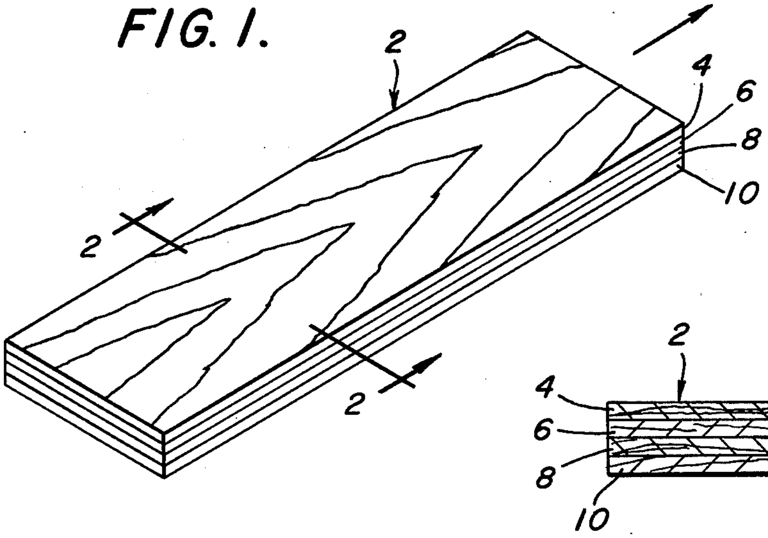
FIG. 2.
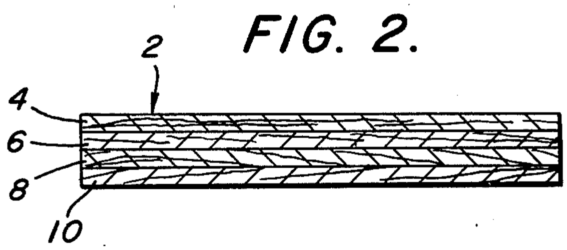
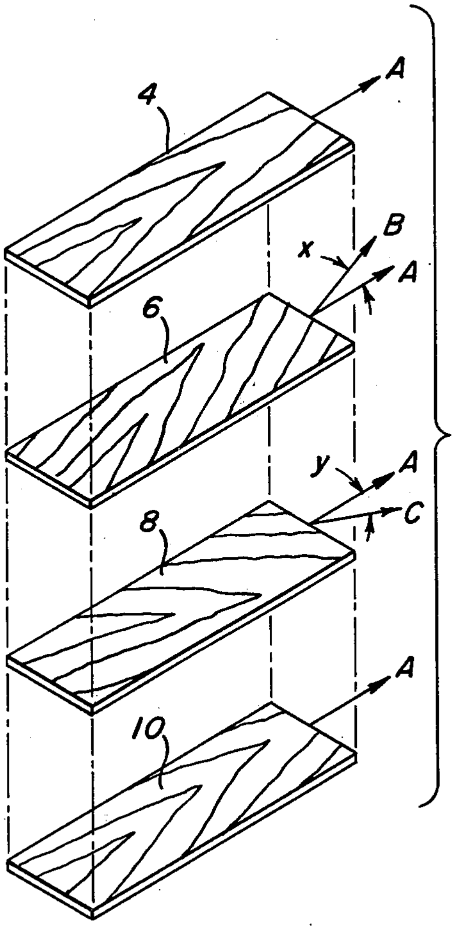
FIG. 3.
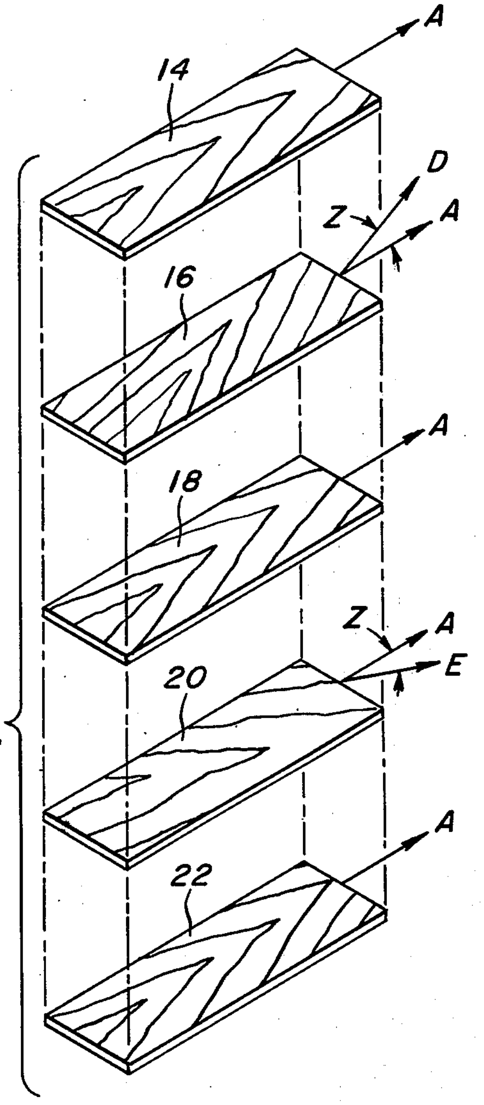
FIG. 4.

HIGH STRENGTH COMPOSITE WOOD VENEER ARTICLES

BACKGROUND OF THE INVENTION

1. Field of the Invention

This invention relates generally to composite wood veneer articles having high strength and adapted for severe working without destroying the aesthetically pleasing appearance. More specifically, the invention is adapted to such a composite wood veneer article wherein specific grain orientations are so provided as to accomplish these objectives.

2. Description of the Prior Art

It has been known in situations where improved strength over that provided by solid lumber is required to provide laminated construction wherein alternate layers have grain orientations oriented generally perpendicularly with respect to each other in order to provide increased strength. Conventional plywood is an example of such a laminated construction. U.S. Pat. No. 2,578,781 discloses the use of alternate layers having grains oriented perpendicularly to each other. The plywood units are subsequently formed into tubular articles. Unfortunately, in producing such plywood, strength is increased at a sacrifice of machine workability. Plywood, when carved or scrolled, tends to disintegrate and become unsightly, particularly about the edges. As a result, the beneficial improved strength characteristics of plywood can be employed only in certain end use environments wherein carving or scrolling is not required or unsightly appearance is not objectionable. In some instances, a compromise is effected by performing additional finishing operations upon the unsightly plywood edge in order to attempt to improve its appearance. Such additional finishing involves increased cost and does not generally produce a completely acceptable, aesthetically pleasing appearance.

U.S. Pat. No. 2,291,426 discloses a package wherein alternate plies have grains oriented generally perpendicularly with respect to each other. U.S. Pat. No. 1,625,280 relates to a wooden container and discloses multiple-layer, adhesively bonded constructions having veneer layers with grains oriented perpendicular to each other as well as at intermediate positions.

A further problem with conventional lumber is its susceptibility to undesired chipping and cracking. U.S. Pat. No. 3,908,725 discloses a suggested approach to increasing the modulus of elasticity and modulus of rupture in conventional lumber. This patent discloses severing of lumber into plies of veneer of about ¼ inch thickness. Three plies of veneer are then adhesively bonded with their grains aligned. The three-ply composite members are then laminated with staggered butt joints so as to produce a piece of laminated lumber one and one-half inch thick or greater multiples thereof. The structure remains, however, merely a reconstructed piece of lumber wherein properties are said to be improved as a result of the multiple laminating and seaming techniques. All grains remain substantially parallel to the longitudinal direction, thereby, in effect, reconstructing the original log grain arrangement.

It has also been known to provide wood layers in combination with plastic materials in order to increase strength. U.S. Pat. No. 3,437,547 discloses a balsa wood assembly having an interposed layer of a polyester. Similarly, U.S. Pat. No. 1,628,886 discloses multiple layer wood construction provided with interposed material such as a pure phenolic condensation product. The wood may be oriented with the grains at differing positions, and high pressure is applied in such fashion that the wood becomes impregnated with the phenolic condensation product, and the wood fibers are compressed, thereby producing unitary, integral mass consisting of compressed wood fibers and penetrated phenolic condensation product. This is to be distinguished from constructions wherein distinct wood veneer layers would remain essentially intact and are merely adhesively bonded to each other.

In U.S. Pat. No. 3,055,065 there is disclosed flexible flooring made of hardwood veneer. It is contemplated that the flooring will be secured to an underlying rigid material which will provide the desired reinforcement, strength and floor rigidity. The flooring may take the form of a single, flexible ply or a two-layer ply having grain orientation offset by a relatively small amount.

U.S. Pat. No. 2,334,619 discloses a tubular wound multiple veneer article fabricated by winding, as by spiral winding, with or without cross winding.

There remains, therefore, a need for a wood article having increased strength and resistance to chipping and cracking as compared with solid lumber as well as the ability to undergo severe carving, scrolling and fine detail work, while preserving an aesthetically desirable appearance and avoiding breaking, flaking and undesired edge disintegration.

SUMMARY OF THE INVENTION

The above described need has been met by the composite wood veneer article of the present invention. The composite article of the present invention provides upper and lower layers of wood veneer having grain orientation generally in a first direction. At least two layers of interposed wood veneer are provided with at least one such layer having a grain orientation offset from the first direction by about 10° to 25°, preferably about 15° to 20°. The adjacent layers of wood veneer are adhesively bonded, preferably substantially continuously, generally in surface to surface relationship.

The composite wood veneer article of this invention has at least four wood veneer layers. Where two interposed layers are provided, both may be offset from the first direction by about 10° to 25°. These interposed layers may be offset on opposite sides of the first direction.

In one embodiment of the invention, three interposed layers may be provided with all of them being offset by about 10° to 25°. In the alternative, one or more of the interposed layers may having grain orientation aligned generally with the first direction.

The composite wood veneer article of the present invention may be generally flat or curved and is preferably substantially rigid.

It is an object of the present invention to provide a composite wood veneer article with improved strength and machine workability without meaningful impairment of the aesthetically desirable characteristics of the structure.

It is a further object of this invention to provide such an article which is adapted to have increased strength in respect of solid lumber as well as resistance to undesired chipping and cracking.

It is yet another object of the present invention to provide a composite wood veneer article which may be subjected to carving, scrolling, even to small tolerances, without production of an unsightly appearance, particularly in the edge portion.

It is yet another object of the present invention to provide a composite wood veneer article which is adapted for painting, staining and other finishing more readily than is the case with conventional plywood, while permitting the use of conventional finishing procedures and materials.

It is yet another object of the present invention to provide a composite wood veneer article which will resist warpage and have uniform expansion and contraction characteristics similar to that of conventional solid lumber, and also will provide improved resistance to warpage as compared with solid lumber.

It is yet another object of this invention to provide the foregoing benefits in respect of properties while preserving the desirable aesthetic appearance of solid lumber.

These and other objects of the invention will be more fully understood from the following description of the invention on reference to the illustrations appended hereto.

DESCRIPTION OF THE DRAWINGS

FIG. 1 illustrates a perspective view of a form of composite wood veneer lumber of the present invention.

FIG. 2 is a cross sectional illustration taken through 2—2 of FIG. 1.

FIG. 3 shows an exploded view of the full four plies of wood veneer employed in the composite article of FIGS. 1 and 2.

FIG. 4 is an exploded illustration of another embodiment of the present invention employing five veneer layers.

DESCRIPTION OF THE PREFERRED EMBODIMENTS

Figure 5:
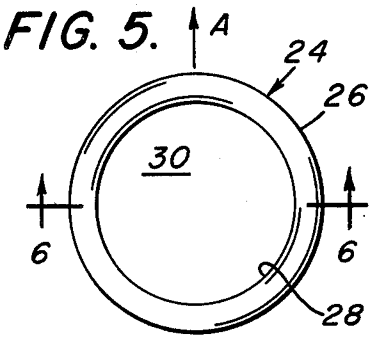
FIG. 5 is a plan view of a ring-like article of the present invention.

Referring now more specifically to FIG. 1, there is shown a composite wood veneer article 2 in the form of a generally rectangular piece of composite lumber-like article. The article 2 has an upper veneer layer 4, a lower veneer layer 10 and two interposed veneer layers 6, 8. The upper veneer layer 4 has a grain oriented generally in a first direction which is indicated by the arrow. While not shown in FIG. 1, the grain orientation of lower layer 10 is also generally in the first direction (indicated by the arrow).

Referring now to FIG. 2, there is shown a cross sectional illustration of the composite wood veneer article 2 of FIG. 1. Adjacent wood veneer layers are secured in generally surface to surface relationship by means of a suitable adhesive (not shown). In the form illustrated in FIG. 2, all of the wood veneer layers 4, 6, 8, 10 are of the same thickness. This thickness may be about 1/64 inch to about ⅜ inch and preferably is about 1/20 inch to about 3/16 inch. If desired, different layers may be made of different thicknesses. For example, it may be desirable to provide a relatively thin upper layer 4 and lower layer 10 of a relatively expensive, decorative wood and thicker interposed layers 6, 8 of one or more different woods.

In the form illustrated in FIGS. 1 and 2, each of the layers 4, 6, 8, 10 is generally rectangular and of generally the same length and width so as to provide a composite wood veneer article having the layers 4, 6, 8, 10 with generally aligned marginal edges.

FIG. 3 illustrates an exploded view of the four layers 4, 6, 8, 10 employed in constructing composite wood article 2. It is noted that upper layer 4 and lower layer 10 each have a wood grain oriented generally in first direction "A". Interposed layer 6 has a wood grain oriented in direction "B" which is offset from direction "A" by an included angle $x$ which is equal to about 10° to 25° and is preferably about 15° to 20°. Similarly, interposed layer 8 has its grain oriented at direction "C", which is offset from first direction "A" by an included angle $y$ which is also about 10° to 25° and preferably about 15° to 20°. While the angle $x$ may equal the angle $y$, and such an approach may be preferable in instances where symmetry of properties is of importance, such equality is not necessary provided that both angles remain within one of the recited ranges. In the form shown in FIG. 3, it is noted that direction "B" is offset from first direction "A" on one side thereof, and direction "C" is offset from direction"A" on the other side. If desired, both direction "B" and "C" may be offset from first direction "A" on the same side thereof, but in the interest of obtaining symmetry of properties about the first direction "A", it is generally preferred to have directions "B" and "C" offset on opposite sides of direction "A". If desired, either interposed layer 6, 8 could have a grain orientation in direction "A", but at least one of the interposed layers 6, 8 must have a grain orientation offset within the recited ranges of angles.

The invention provides a composite wood veneer article which is substantially rigid and has improved strength as compared with comparable lumber of the same dimension and wood selected. By providing specifically positioned grain orientations which are offset in interposed layers 6, 8, and upper and lower layers 4, 10 having grain orientations in a first direction, it is possible to preserve the desirable appearance of ordinary lumber while providing improved strength. All of this is accomplished by use of a composite veneer construction having at least four veneer layers with the specifically disclosed, relative grain orientations in an adhesively bonded assembly.

Referring now to FIG. 4, there is illustrated an exploded view of another version of the invention which employs five veneer layers to create a generally flat composite wood veneer article. In external appearance, when assembled, the embodiment of FIG. 4 may appear very much like the embodiment shown in FIG. 1, except for the presence of an additional veneer layer. In the form shown in FIG. 4, upper layer 14, interposed layer 18 and lower layer 22 all have grain orientations generally in the first direction "A". Interposed layer 16 has a grain orientation in direction "D" which is offset from direction "A" by an angle *z* which is equal to about 10° to 25° and preferably about 15° to 20°. Interposed layer 20 has a grain orientation in a direction "E" which is offset from first direction "A" by angle *z*, also. As has been noted above, while the two offset grain orientation directions "D", "E" are shown as being on opposed sides of first direction "A", there could be provided on the same side of first direction "A", if desired. Also, in this embodiment, the angles of offset are both illustrated as being equal to angle *z*, if desired, the angles could be different provided they remain within the recited ranges.

While in the form shown in FIG. 4, interposed layer 18 has a grain orientation in direction "A" and interposed layer 16, 20 have offset grain orientation, it will be appreciated that other combinations of relative grain orientation may be provided. All that is required is that at least one interposed layer 16, 18, 20 has a grain orientation offset from first direction "A" by the recited ranges of angles. It is, however, preferred that, in a five-layer wood veneer article, that at least two such offset grain orientations be provided, and it is further preferred that they be offset on opposite sides of first direction "A".

In the preceding discussion, the description of the composite wood veneer article has been with reference to a generally rectangular, substantially flat lumber-like article. It will be appreciated, however, that, if desired, the article may consist of a curved composite wood veneer article constructed essentially as described above except for its being formed into a simple or compound curved contour. It will be further appreciated that in view of the increased strength of the article of this invention as compared with solid lumber, coupled with the fact that even finely detailed scroll and carving work does not destroy the desired edge finish, a wide range of wood articles in the nature of finished or semi-finished products may be made from the basic wood article, and such articles are encompassed within the present invention. While several specific examples will be discussed hereinafter, the invention is not so limited.

Figure 6:
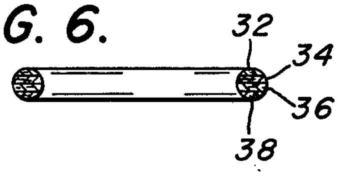
FIG. 6 is a cross sectional illustration through 6—6 of FIG. 5.

Referring now to FIGS. 5. and 6, there is shown a composite wood veneer article 24 in the form of a wooden ring which has an outer periphery 26 of generally circular configuration and an inner periphery 28 of generally circular configuration defining opening 30. As is shown in FIG. 6, the ring 24 consists of upper layer 32, lower layer 38 and interposed layers 34, 36 and has a generally circular cross sectional configuration. It is contemplated that upper layer 32 and lower layer 38 will have grain orientation in first direction "A", and that at least one of, and preferably both of, interposed layers 34, 36 will have a grain orientation offset from first direction "A" by about 10° to 25° and preferably from about 15° to 20°.

The ring-like composite wood veneer article of FIGS. 5 and 6 may conveniently be made by first constructing an article such as that shown in FIG. 1 and subsequently blanking a disc from the article with the center being removed either prior to blanking or subsequent thereto. In the form shown in FIG. 6, the outer periphery 26 and inner periphery 28 may conveniently be provided with a curved surface by machining with a wood router bit. Subsequently, suitable sanding and painting, staining or other finishing may be accomplished. The final product is strong and is aesthetically pleasing.

Figure 7:
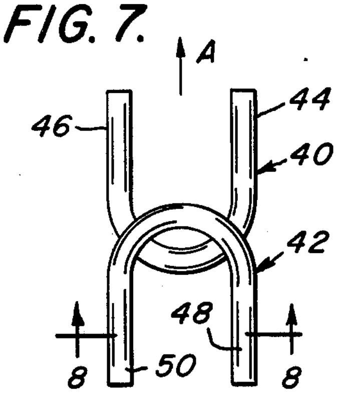
FIG. 7 illustrates a pair of composite articles of the present invention so configurated and joined as to provide carved and scrolled elements for a number of uses such as chairbacks, for example.
Figure 8:
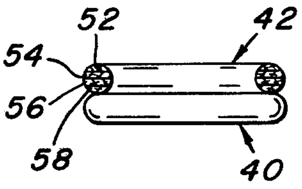
FIG. 8 is a cross sectional view of the elements of FIG. 7 taken through 8—8.

Referring now to FIGS. 7 and 8, an example of the use of carved and scrolled composite wood veneer articles of this invention will be considered. Selected for purposes of illustration is the sort of unit which might be employed to provide a chairback or other decorative portion of an article of furniture or other article, when a suitable number are assembled in the proper orientation. Generally U-shaped member 40 has a pair of upwardly projecting legs 44, 46 and generally U-shaped member 42 has a pair of downwardly projecting legs 48, 50. Each of these members 40, 42 has been separately fabricated by carving and scrolling from a lumber-like article such as article 2 shown in FIGS. 1 and 2. They may be fabricated by conventional wood-forming technique, provide improved structural strength and do not deteriorate aesthetically when subjecting to the carving and scrolling required to fabricate the shape. The members 40, 42 may be secured to each other by any suitable means such as an adhesive, screws or other fastening means. As is shown in FIG. 8, U-shaped member 42 has upper layer 52 and lower layer 58 with grain orientation (not shown) generally in first direction "A". At least one of interposed layers 54, 56 has an offset grain orientation which establishes an angle of about 10° to 25° and preferably about 15° to 20° with respect to first direction "A".

Figure 9:
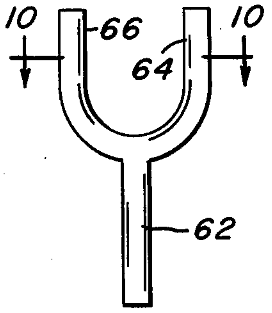
FIG. 9 is a front elevational view of a slingshot body composed of material prepared in accordance with the present invention.
Figure 10:
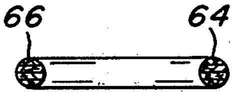
FIG. 10 is a cross sectional view of the slingshot body of FIG. 9 taken through 10—10.

Referring now to FIGS. 9 and 10, there is shown a unitary composite wood veneer article in the form of a slingshot body. The sling-shot body has a handle or grip portion 62 and a pair of upwardly projecting spaced arms 64, 66. This construction may advantageously be made from a unitary generally flat lumber-like composite veneer article such as that shown in FIG. 1. It provides the advantage of increased strength for an article where strength is important, coupled with an aesthetically pleasing finish which also eliminates the ragged edges which might result were plywood to be employed in the absence of the extra burden and expense of attempting to refinish after carving and scrolling. In this particular end use, the ragged edge is of consequence not only in terms of aesthetics, but also the possibility of injury to the user through splinters.

Figure 11:
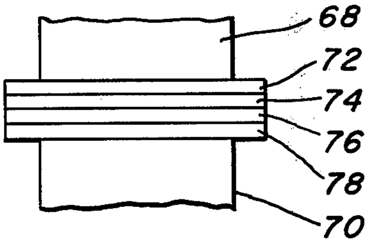
FIG. 11 is a fragmentary illustration of a conventional straight press forming a generally flat composite wood veneer article of the present invention.
Figure 12:
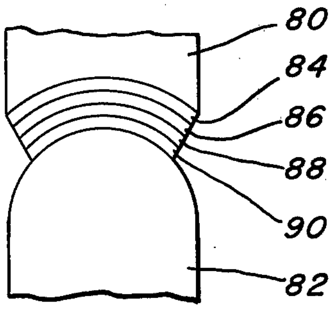
FIG. 12 is a fragmentary illustration of a conventional curved press forming a curved composite wood veneer article of the present invention.

As has been noted above, another advantage of the article of the present invention is the ability to fabricate the same employing conventional equipment, and, as a result, not involving the investment in additional capital equipment. As is shown schematically in FIG. 11, a conventional press having a press ram or platen 68 and press base 70 may be employed to establish a composite wood veneer article having upper layer 72, lower layer 78 and interposed layer 74, 76 by applying a suitable adhesive between each pair of adjacent veneer surfaces and applying a predetermined press pressure at either elevated or room temperature to produce a substantially flat composite wood veneer article such as article 2 shown in FIG. 1. Similarly, as is shown in FIG. 12, complementary curvature may be provided in press elements 80, 82 in order to establish a curved composite article from upper veneer layer 84, lower veneer layer 90 and interposed veneer layers 86, 88.

Figure 13:
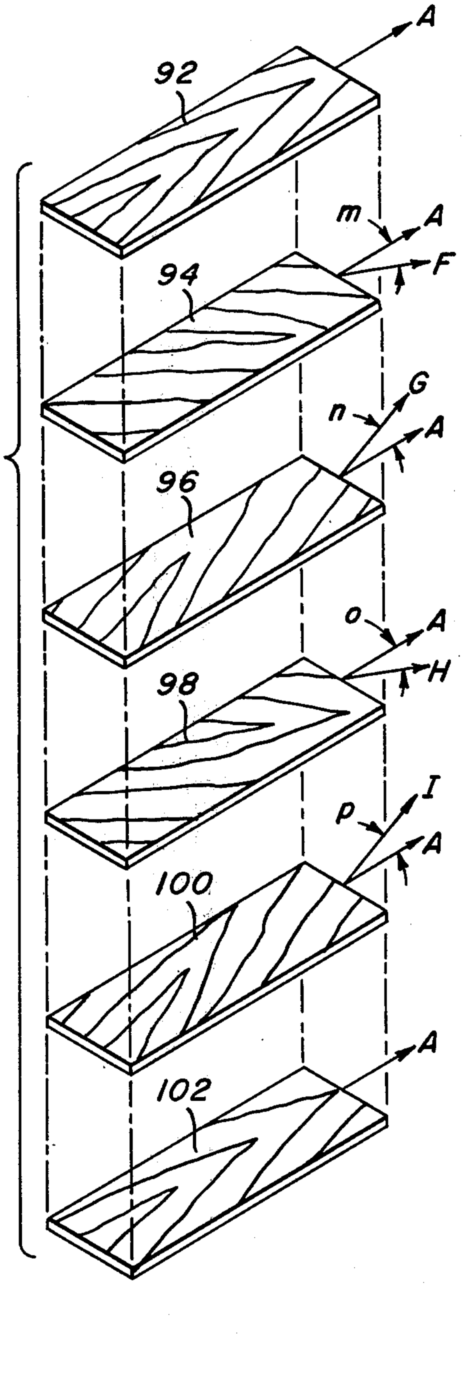
FIG. 13 is an exploded illustration of another embodiment of the present invention employing six veneer layers.

As the present invention contemplates the use of any number of wood veneer layers provided at least four are employed, a further example showing a six-layer composite article is shown in FIG. 13. In this embodiment, in the form shown in FIG. 13, upper layer 92 and lower layer 102 have grain orientations generally in first direction "A". The interposed layers 94, 96, 98, 100 have grain orientations offset from first direction "A" with the direction of offset being alternated between adjacent layers. Interposed layer 94 has a grain orientation generally in the direction "F" which is offset to the right of the direction "A" by an included angle *m*. Interposed layer 96 has a grain orientation generally in a direction "G" offset to the left of first direction "A" by included angle *n*. Interposed layer 98 has a grain orientation generally in direction "H" offset to the right of first direction "A" by an angle *o*. Interposed layer 100 has a grain orientation generally in direction "I" which is offset to the left of first direction "A" by an included angle *p*. Angles *m, n, o, p* will be about 10° to 25° with about 15° to 20° being preferred. For maximum symmetry of properties, where desired, the angles *m, n, o, p* will be either equal or of generally similar magnitudes, but all will fall within the recited ranges. If desired, only one of the interposed layers 94, 96, 98, 100 or less than all four thereof may have its grain orientation offset by an angle falling within the recited range. It is preferred that at least three of the four interposed layers 94, 96, 98, 100 have a grain orientation offset for improved strength.

Figure 14:
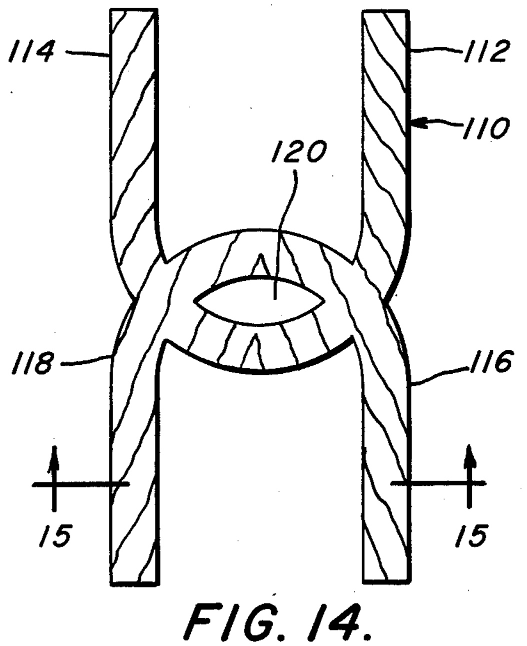
FIG. 14 illustrates another article of the invention having essentially the identical shape and dimensions, in plan, as the article of FIG. 7, except that it is formed from a single piece of composite wood prepared in accordance with the present invention.
Figure 15:
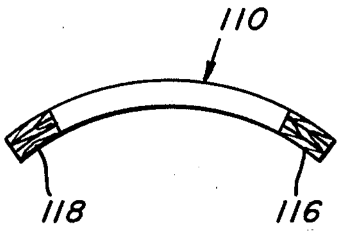
FIG. 15 is a cross sectional view of the article of FIG. 14 taken through 15—15.

Reference is now made to FIGS. 14 and 15 in order to illustrate further advantageous features of the invention. There is shown a generally H-shaped article 110 of the present invention which, in plan, is generally of the same shape and dimensions as the composite article shown in FIGS. 7 and 8. It has legs 112, 114, 116, 118 and defines a central opening 120. Unlike the article of FIGS. 7 and 8, which is made by assembling members 40, 42, the article 110 of FIGS. 14 and 15 is made from a unitary piece of composite wood veneer by carving and scroll work. It is strong, remains aesthetically pleasing and eliminates the need for joining separate elements.

A further difference between article 110 of FIGS. 14 and 15 and the article of FIGS. 7 and 8 is that the former has been provided with a predetermined curvature. This will serve to provide an additional functional and decorative variation which is facilitated by the present invention. It is further noted, as is shown in FIG. 15, that four layered article 110 has a generally rectangular cross section as distinguished from the circular cross section of FIG. 8. By making the lumber-like composite wood veneer article generally of the desired final thickness of article 110, this rectangular cross section is readily established while reducing the amount of additional shaping required to provide the desired rectangular cross sectional shape.

Figure 16:
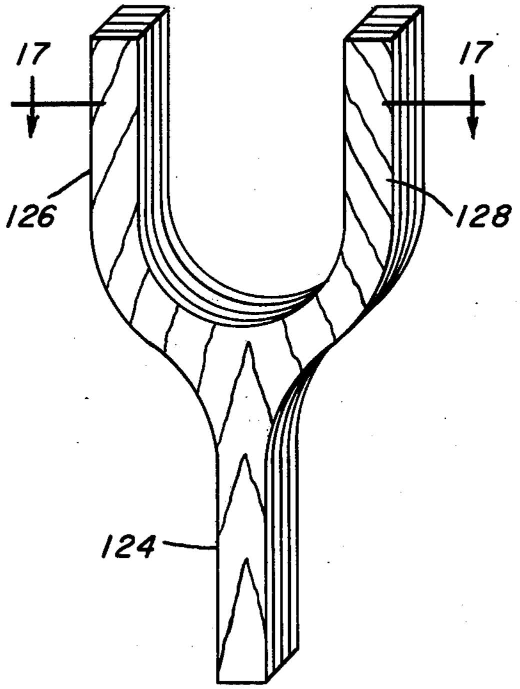
FIG. 16 is a perspective view of another form of slingshot body of the present invention.
Figure 17:
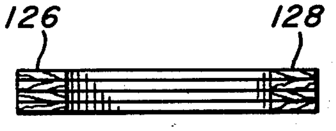
FIG. 17 is a cross sectional view of the slingshot body of FIG. 16 taken through 17—17.

FIGS. 16 and 17 illustrate a modified slingshot body construction which is provided with a generally rectangular cross sectional configuration as distinguished from the generally circular cross section of FIGS 9 and 10. The slingshot body has a handle or grip portion 124 and a pair of upwardly projecting spaced arms 126, 128. FIG. 17 shows the four layered rectangular cross sectional shape which, in the form shown, extends through the grip portion 124. An economic advantage may be obtained in this form as it eliminates the need to establish the circular cross section illustrated in FIG. 10, and the original lumber-like composite veneer article from which it is made may be made to correspond in thickness with the desired thickness of the slingshot body.

The wood veneer which is employed in creating the composite wood veneer article of this invention may be selected from a wide range of wood materials depending upon the properties required, the particular end use contemplated, and economic considerations. Among those preferred for most uses are woods selected from the group consisting of maple, walnut, ash, poplar, cherry, oak, mahogany, pine and birch. If desired, as has been noted above, for economic reasons or other reasons, the species of wood employed may be different for different veneer layers. For example, a high strength, relatively inexpensive wood may be employed in interposed interior layers, and a relatively expensive, attractive wood may be exposed for exterior reexposed layers. In addition, if desired, the veneer thickness of the layers may be different. While in general, the preferred thickness for the veneer layers is about 1/64 inch to ⅜ inch, and a specifically preferred range of thickness is about 1/20 inch to 3/16 inch, in all instances, at least four veneer layers will be employed. The thickness selected for particular layers will depend to an extent upon some of the aforementioned economic, aesthetic and property considerations, but, in addition, will be determined to a certain extent by the desired overall thickness of the article and rigidity required.

A further advantage of the present invention is its resistance to undesired warpage. It also provides uniform expansion and drying patterns similar to solid wood by permitting expansion across the grains uniformly as a result of the relative grain orientations in which the wood layers have been glued.

It is contemplated that the adjacent layers of veneer will be secured in generally surface to surface relationship by means of a suitable adhesive (not shown), preferably applied as a continuous layer. While the particular adhesive being selected will frequently depend upon the intended end use, it is generally preferred to employ a water-resistant or water-proof adhesive which will effectively prevent loss of bonding during storage, subsequent working, handling and use in a wide range of environments over an extended period of time. If desired, a disbursant may be provided in the adhesive to increase the strength of the resultant article. One particularly suitable adhesive is that marketed under the designation "CL-8800 Fast Curing Resin Emulsion (Type II Bond)" sold by National Casein. This is a water-solvent type adhesive and is particularly suited to bonding porous and semi-porous materials and has a viscosity of about 500–4500 cps at 78° F which makes it easy to apply. Among other suitable adhesives are those sold under the trademarks "GULF L100 Formaldehyde Resin" and "Melamine MB-330".

EXAMPLE

A specific example of the manufacture of a composite article of the present invention will be considered. Four elongated, rectangular wood veneer plies are provided. Two of the rectangular plies have grains oriented generally longitudinally. The other two wood veneer plies have grains offset from the longitudinal direction by about 18°. The wood veneer elements are of the same length and width as are dried to a moisture content of about 6 to 10 percent. Both surfaces of the two veneer plies having offset grain orientations are covered with a continuous layer of an adhesive. The four veneer layers are placed together in such fashion that the longitudinally oriented grain elements provide upper and lower veneer layers, and the offset grain veneer layers are interposed with the offset of each of the two layers being about 18° and being on opposite sides of the longitudinal grain direction. The marginal edges of the four veneer layers are aligned, and the assembly is placed in a conventional press. Approximately 100 lbs. per square inch pressure is applied substantially continuously to the entire assembly by means of the press while the assembly is essentially at ambient room temperature. After about twelve hours in a cold press which is sufficient to permit the adhesive to set, the press is opened and the composite wood veneer article is withdrawn. Subsequent carving, scrolling or other fabrication of semi-fabricated or completed wood article may then be commenced if desired.

It will therefore be appreciated that the present invention provides a unique composite wood veneer article having improved strength properties, improved workability by conventional equipment and methods without undesired destruction of the appearance. All of this is accomplished in an economical fashion which permits the use of relatively inexpensive filler woods in producing a rigid, high strength, aesthetically pleasing article.

For the purposes of illustrations, certain specific end uses, shapes and products have been disclosed, it will be appreciated that a wide range of semi-fabricated and fully fabricated articles may be made from the composite wood veneer article in lumber-like form. For example, various decorative wall hangings, rifle stocks, components for articles of furniture, curtain rings, bracelets and other decorative and functional items may be produced. Also, the basic lumber-like composite veneer article need not be generally rectangular in plan, but may readily be made in other desired shapes.

While for purposes of simplicity of disclosure herein, reference has been made to "upper layers", "lower layers" and the like, these terms have been employed for convenience of reference in of relative positioning of these elements in respect to the interposed layers, and in the absence of express contrary indications are in no fashion to be interpreted as limiting on the invention. For example, it may be desirable in certain uses to place additional materials over the upper layer or under the lower layer.

Whereas, particular embodiments of the invention have been described above for purposes of illustration, it will be evident to those skilled in the art that numerous variations of the details may be made without departing from the invention as defined in the appended claims.

I claim:

1. A composite wood veneer article comprising
   a lower layer of wood veneer having a grain orientation generally in a first direction,
   an upper layer of wood veneer having a grain orientation generally in said first direction,
   at least two layers of wood veneer interposed between said lower and said upper layers,
   at least one of said interposed layers having a grain orientation offset from said first direction by about 10° to 25°,
   none of said interposed layers having a grain orientation offset from said first direction by more than about 10° to 25°,
   adjacent layers of wood veneer being adhesively bonded in generally surface to surface relationship, and
   said composite article being substantially rigid.

2. The composite wood veneer article of claim 1 including
   said article having two said interposed layers, and
   the grain orientation of each of said two interposed layers being offset from said first direction by about 10° to 25°.

3. The composite wood veneer article of claim 1 including
   said article having three said interposed layers, and
   at least one of said interposed layers having a grain orientation generally in said first direction.

4. The composite wood veneer article of claim 1 including said layers having generally aligned marginal edges.

5. The composite wood veneer article of claim 1 including
   said article having four interposed layers and
   at least three of said four interposed layers having a grain offset from said first direction by about 10° to 25°.

6. The composite wood veneer article of claim 1 including
   said article having a nonrectangular peripheral configuration in plan.

7. The composite wood veneer article of claim 2 including
   said two interposed layers grain orientations being offset from said first direction on opposite sides of said first direction.

8. The composite wood veneer article of claim 3 including
   two said interposed layers having grain orientations offset from said first direction by about 10° to 25°.

9. The composite wood veneer article of claim 4 including
   said composite article being generally flat.

10. The composite wood veneer article of claim 4 including
   said composite article being curved.

11. The composite wood veneer article of claim 8 including
   said offset grain interposed layers being offset from said first direction on opposite sides of said first direction.

12. The composite wood veneer article of claim 5 including
   all four of said interposed layers having a grain orientation offset from said first direction by about 10° to 25° and
   two said interposed layers being offset on each side of said first direction.

13. The composite wood veneer article of claim 6 including said article being of generally ring-like configuration.

14. The composite wood veneer article of claim 6 including said article being a slingshot body.

15. The composite wood veneer article of claim 11 including said offset grain interposed layers being disposed on opposite sides of said other interposed layer.

16. The composite wood veneer article of claim 1 including said grain orientation offset being about 15° to 20°.

* * * * *